(12) United States Patent
Illing

(10) Patent No.: US 8,331,024 B1
(45) Date of Patent: Dec. 11, 2012

(54) TIME DOMAIN POLARIZATION SCRAMBLER

(75) Inventor: Rainer M. E. Illing, Broomfield, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 35 days.

(21) Appl. No.: 12/841,556

(22) Filed: Jul. 22, 2010

(51) Int. Cl.
 *G02B 5/30* (2006.01)
(52) U.S. Cl. .................. 359/489.01; 359/278; 359/237; 359/279
(58) Field of Classification Search .................. 359/278, 359/279, 489.01
 See application file for complete search history.

(56) References Cited

U.S. PATENT DOCUMENTS

| 6,970,278 B1 * | 11/2005 | Buican ........................... 359/240 |
| 7,554,667 B1 | 6/2009 | Kampe |
| 2003/0067667 A1 * | 4/2003 | Wang et al. .................... 359/323 |
| 2009/0168010 A1 * | 7/2009 | Vinogradov et al. ......... 349/200 |

OTHER PUBLICATIONS

Azzam, R.M.A., "Photopolarimetric measurement of the Mueller matrix by Fourier analysis of a single detected signal", Optics Letters, vol. 2, No. 6, Jun. 1978 (3 pages).
Collett, Edward, "Polarized Light in Fiber Optics", The PolaWave Group, SPIE, 2003 (36 pages).
Division on Engineering and Physical Sciences, Space Studies Board, Committee on Earth and Applications from Space: A Community Assessment and Strategy for the Future, "Earth Science and Applications from Space: National Imperative for the Next Decade and Beyond", The National Academies Press, 2007, (455 pages).
Dobber et al., "Ozone Monitoring Instrument Calibration", IEEE Transactions on Geoscience and Remote Sensing, vol. 44, No. 5, May 2006 (30 pages).
Goldstein et al., "Error analysis of a Mueller matrix polarimeter", Journal of the Optical Society of America, vol. 7, No. 4, Apr. 1990 (8 pages).
Goldstein, Dennis H., "Mueller matrix dual-rotating retarder polarimeter", Applied Optics, vol. 31, No. 31, Nov. 1, 1992 (8 pages).
Kemp, James C., "Piezo-Optical Birefringence Modulators: New Use for a Long-Known Effect", Journal of the Optical Society of America, vol. 59, No. 8, Aug. 1969 (5 pages).
Lu et al., "Interpretation of Mueller matrices based on polar decomposition", Journal of the Optical Society of America, vol. 13, No. 5, May 1996 (8 pages).
Illing, Rainer M. E., "The BATC Imaging Stokes Polarimeter: The Need for Speed", Sensiac, Ga. Inst. Tech, Passive Sensors Conference, Feb. 15, 2006 (15 pages).
Povel, Hanspeter, "Imaging Stokes polarimetry with piezoelastic modulators and charge-coupled-device image sensors", Optical Engineering, vol. 34, No. 7, Jul. 1995 (9 pages).
Smith, Matthew H., "Optimization of a dual-rotating-retarder Mueller matrix polarimeter", Applied Optics, vol. 41, No. 13, May 1, 2002 (6 pages).

(Continued)

Primary Examiner — James Jones
(74) Attorney, Agent, or Firm — Sheridan Ross P.C.

(57) ABSTRACT

The present invention relates to a temporal depolarization assembly. The depolarization assembly operates to produce light that, over some period of time, is depolarized. The depolarization assembly includes first and second variable retarders. The variable retarders are operated to produce a retardance that varies in time. In addition, the modulator axis of a first one of the variable retarders is held at an angle to the modulator axis of the second one of the variable retarders. The frequency at which the retardance of the variable retarders varies is selected to be some fraction of the integration time of a sensor associated with the polarization assembly.

19 Claims, 5 Drawing Sheets

OTHER PUBLICATIONS

Illing, Rainer M. E., "Design and development of the PolZero Time Domain Polarization Scrambler", Society of Photo-Optical Instrumentation Engineers, 2009 (10 pages).

Wang et al., "Basic Optical Properties of the Photoelastic Modulator Part I: Useful Aperture and Acceptance Angle", Polarization Science and Remote Sensing II, SPIE vol. 5888, 2005 (8 pages).

"Dual PEM Systems", available at http://www.hindsinstruments.com/products/photoelastic-modulators/dual-pem-systems/, Hinds Instruments, Inc., 2010 (3 pages).

"PEM- 100 Controller", available at http://www.hindsinstruments.com/products/photoelastic-modulators/pem-100-controller/, Hinds Instruments, Inc., 2010 (2 pages).

"Photoelastic Modulators", Technology for Polarization Measurement, Head Assemblies, Hinds Instruments Product Bulletin, Hinds Instruments, Inc., 2010 (3 pages).

Cheng et al., "Polarization scrambling using a photoelastic modulator: Application to circular dichroism measurement", Journal of the Optical Society of America, vol. 65, No. 9, Sep. 1975 (5 pages).

Cheng, J.C., "Polarization scrambling using a photoelastic modulator: Application to linear dichroism measurement", American Institute of Physics, Rev. Sci. Instrum., vol. 48, No. 8, Aug. 1977 (4 pages).

\* cited by examiner

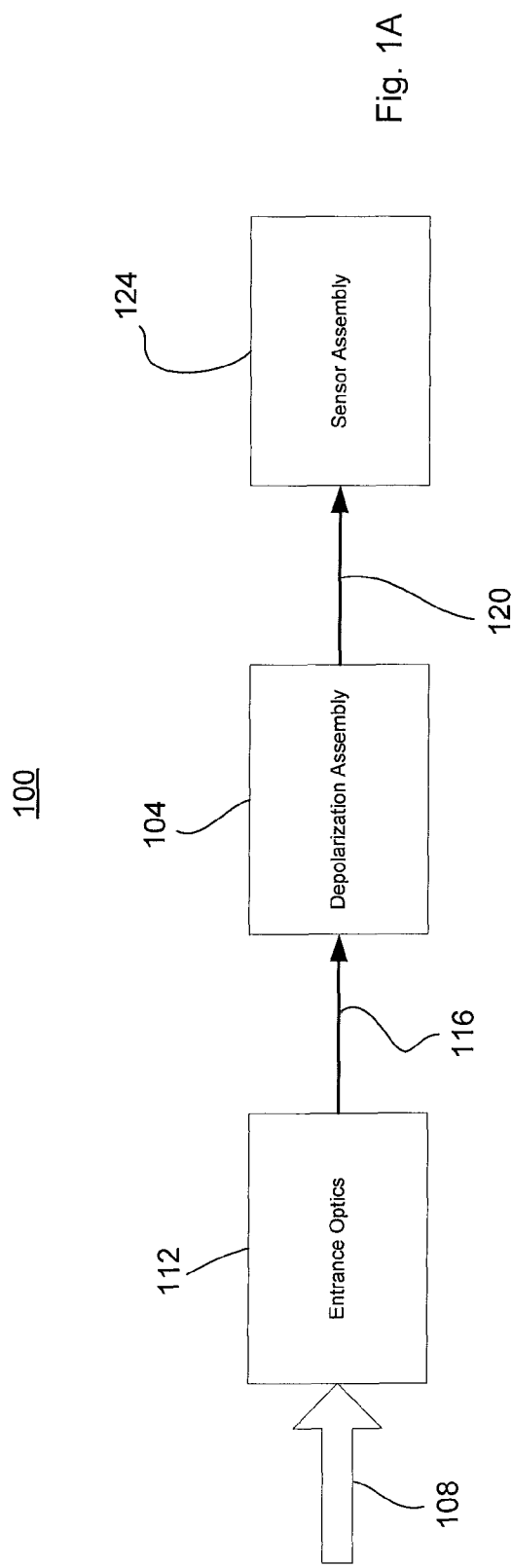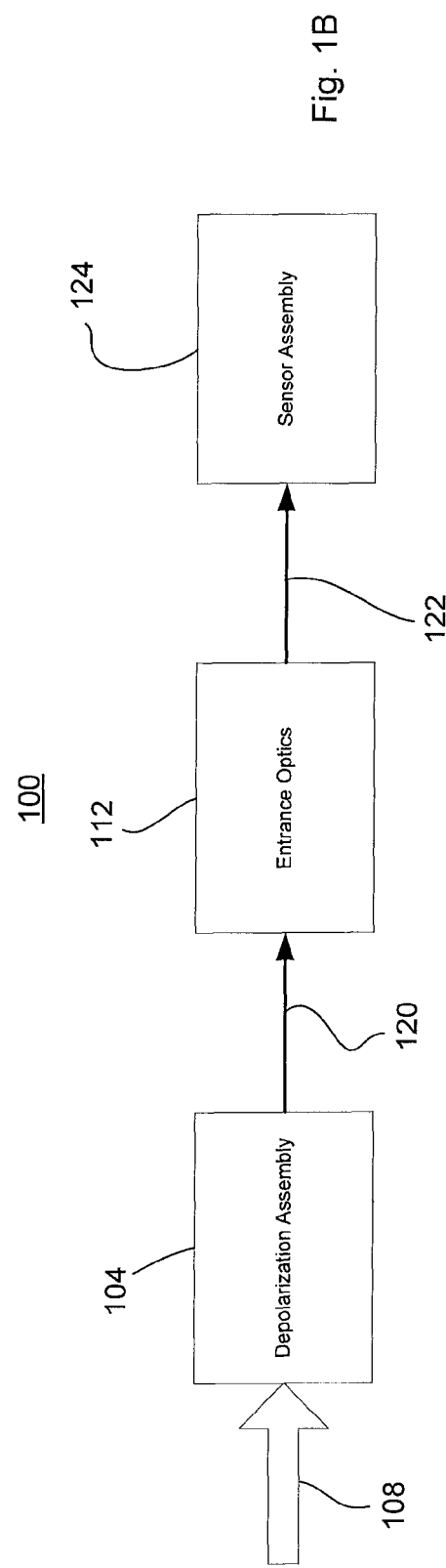
Fig. 1A
Fig. 1B

TIME DOMAIN POLARIZATION SCRAMBLER

FIELD

The present invention relates to providing depolarized light. In particular, methods and systems for depolarizing light using high frequency polarization modulation elements are provided.

BACKGROUND

Low polarization sensitivity is critical for a number of Earth science applications, including the measurement of ocean color and ozone from satellite sensors. For example, several National Research Council Decadal Survey science objectives are based on spectrometric measurements over wide spectral ranges and large spatial extents. The upwelling Earth radiation is polarized, with the spatial and spectral polarization texture dependent on variations in the solar scattering geometry, the aerosol, cloud, and molecular content of the line of sight column, and the time dependence of multi-scale weather patterns. While this presents a rich harvest of information for a polarimetric sensor, it simultaneously produces a confounding overlay on the purely photometric assessment of spatio-spectral information, due to innate polarizance in spectrally diverse optical trains. Polarization management is a way of life for designers of spectrometric sensors; without it, the few percent polarization differences from place to place could mask significant differences in ocean color and aerosol loading, for instance hiding toxic algal blooms harboring Vibrio cholerae, or obscuring rich fishing grounds.

Polarization control places serious constraints on the optical designs of sensors, particularly for wide field of view imaging spectrometers. In order to control polarization, low angles of incidence on mirrors and filters have been required. In addition, polarization control has necessitated stringent requirements concerning the optical properties of mirrors, filters, and anti-reflection coatings on system optical elements. A particularly challenging problem is presented by imaging spectrometers, since the diffraction grating used in such instruments is strongly polarizing.

The mitigation of radiometric errors introduced by variable polarization in an incident beam can be achieved by introducing a polarization control element early in the optical train, to produce a known and controllable polarization state in the light seen by the downstream optics. For example, an element that transforms input light into a quasi-unpolarized beam can be provided. In one approach, spatial averaging or recombination is achieved using birefringent crystal devices. Implementations that include birefringent crystals present challenges as a result of the inherent beam deviation that results in such systems. In particular, the beam separation produced by crossed pairs of birefringent material results in four separate polarized images. These images, each uniquely polarized, have a projected separation in object space, resulting in image degradation. For example, for beams that have a projected separation of 0.4 degrees in object space, the resulting ground resolution for a spectrometer at geosynchronous orbit is 12 kilometers. Moreover, the separation of the beams in object space results in an increased point spread function (i.e., a large image spot). Depolarization devices that average in the spectral domain employ color filters. In such devices, polarization varies with wavelength. Because of this wavelength dependent polarization characteristic, depolarizers that average in the spectral domain cannot be used in spectrometers.

SUMMARY

The present invention is directed to solving these and other problems and disadvantages of the prior art. In accordance with embodiments of the present invention, a depolarization assembly or time domain polarization scrambler is provided in which temporal averaging is employed. More particularly, the polarization of a beam is modulated at high frequency with respect to the integration time of the instrument sensor, to produce results approximating transmission through an ideal depolarizer.

In a depolarization assembly in accordance with embodiments of the present invention, light is passed through a pair of variable retarders. The variable retarders are operated such that the amplitude of the optical retardation effect along one transmission axis of a transmission medium, and thus the polarization effect, changes with time. More particularly, the variation in retardation cycles between maximum and minimum levels is performed at a frequency high enough to provide a multiplicity of polarization cycles during a typical integration time of the sensor provided with light from the depolarizer. As a result, a net null polarized beam is received at the sensor.

In accordance with embodiments of the present invention, first and second variable retarders are provided in series. Moreover, the variable transmission axis of each of the variable retarders are rotated at 45° with respect to one another. The retardation of each variable retarder can be varied by about ±2.4 radians for each cycle. As used herein, "about" with respect to an angular dimension expressed as a number of radians means within ±0.05 radians. Exemplary embodiments can utilize a pair of photo-elastic modulator elements.

In accordance with embodiments of the present invention, depolarized light is produced by passing received light through first and second variable retarder elements. The first variable retarder elements each retard the transmission of light along a first axis by about ±2.405 radians. The second variable retarder has a variable transmission axis that is rotated with respect to the one another by 45°. The variable retardance, in at least some embodiments, can be achieved by exciting a transmission medium at a selected resonant frequency. For example, a transmission medium can be excited by a piezo-electric actuator such that the retardance of an associated transmission medium with respect to input light varies between the maximum and minimum level of retardation at a relatively high frequency. In particular, the frequency of variation is high enough that multiple cycles are completed during the integration time of a sensor downstream of the depolarization assembly.

Additional features and advantages of embodiments of the present invention will become more readily apparent from the following discussion, particularly when taken together with the accompanying drawings.

BRIEF DESCRIPTION OF THE DRAWINGS

FIGS. 1A and 1B are schematic diagrams depicting instruments incorporating a depolarization assembly in accordance with embodiments of the present invention;

DETAILED DESCRIPTION

Figure 2:
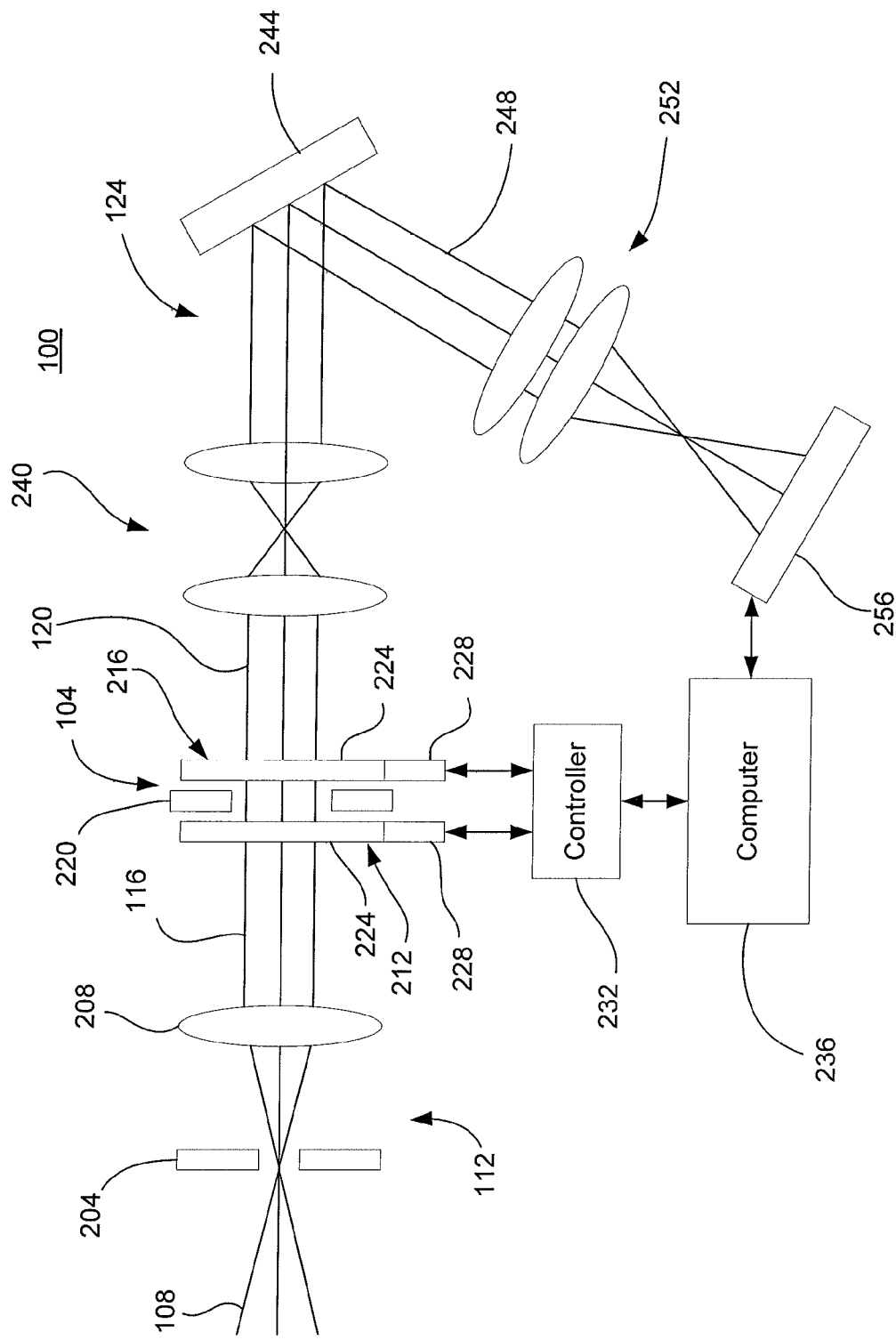
FIG. 2 is a block diagram depicting components of an instrument incorporating a depolarization assembly in accordance with embodiments of the present invention.

FIG. 1A is a schematic diagram depicting an instrument 100 incorporating a depolarization assembly or time domain polarization scrambler (TDPS) 104 in accordance with embodiments of the present invention. More particularly, light ("collected light") 108 is received through entrance optics 112. The collected light 108 can comprise light reflected from objects or materials within a field of view of the entrance optics 112. For example, where the instrument 100 comprises a downward looking, on-orbit spectrometer, the collected light 108 can include light within the line of sight column that has been reflected due to solar scattering, aerosols, clouds, molecular content, and terrestrial features. The entrance optics 112 may comprise refracting, reflecting, field stop, filter, and/or other optical elements that operate to collect and/or condition light as desired, and to define the field of view of the instrument 100.

Collected light 108 gathered by the entrance optics 112 is passed as received light 116 to the depolarization assembly 104. The received light 116 is typically differentially polarized across the area of the beam. Moreover, the polarization of the received light 116 can vary in time. As can be appreciated by one of skill in the art, the polarization texture across the beam is dependent on the content of the line of sight column from which the collected light 108 gathered by the entrance optics 112 is received. As described in greater detail elsewhere herein, the depolarization assembly 104 transforms received light 116 to temporally depolarized light 120. The temporally depolarized light 120 is then passed to a sensor assembly 124. In accordance with embodiments of the present invention, the sensor assembly 124 can comprise a spectrometer. In accordance with further embodiments of the present invention, the sensor assembly 124 can comprise an imaging spectrometer. Other examples of a sensor assembly 124 include imaging cameras, LIDARs, intensity sensors, or other devices sensitive to optical wavelengths, that can usefully be provided with temporally depolarized light 120 as an input signal. In accordance with still further embodiments, the sensor assembly 124, together with depolarization assembly 104, can comprise a polarimeter.

FIG. 1B is a schematic diagram depicting an instrument 100 incorporating a depolarization assembly 104 in accordance with other embodiments of the present invention. More particularly, collected light 108 is first passed through the depolarization assembly 104. The depolarization assembly 104 then provides temporally depolarized light 120 to entrance optics 112 of the instrument 100. Accordingly, the depolarization assembly 104 in combination with the entrance optics 112 can define the field of view of the instrument 100. Received temporally depolarized light 122 is passed by the entrance optics 112 to the sensor assembly 124. The configuration illustrated in FIG. 1B allows temporally depolarized light 120 to be provided to the remaining optical system of the instrument 100. Such a configuration is often advantageous. Moreover, although certain exemplary embodiments discuss placement of the depolarization assembly 104 disclosed herein after entrance or collection optics 112, alternate configurations in which the depolarization assembly 104 is placed in front of entrance optics 112, or incorporated as part of entrance optics 112, are within the scope of the present invention.

FIG. 2 is a block diagram depicting components of an instrument 100 incorporating a depolarization assembly 104 in accordance with embodiments of the present invention. In FIG. 2, the entrance optics 112 are illustrated as including a field stop 204 and a lens assembly 208. Together, these components of the entrance optics 112 define the maximum field of view of the instrument 100, over which collected light 108 can be gathered. These components of the entrance optics 112 are presented for illustration purposes only. As can be appreciated by one of skill in the art, additional and/or alternative optical elements can be included as part of the entrance optics 112. The entrance optics 112 provide the collected light 108 as received light 116 that is directed to the depolarization assembly 104 along a first optical path. Although depicted in FIG. 2 as collimated light, embodiments of the present invention do not require that the received light 116 passed to the depolarization assembly 104 be collimated. Instead, at least some embodiments of a depolarization assembly 104 as described herein can accept received light 116 over a range of input angles, while remaining effective at producing temporally depolarized light 120.

The depolarization assembly 104 is generally located along the first optical path so that the received light 116 is passed to the depolarization assembly 104. The depolarization assembly 104 includes a first variable retarder 212 in series with a second variable retarder 216. Received light 116 is passed through the first variable retarder 212 located along the first optical path, and is then passed through the second variable retarder 216, also located along the first optical path. The depolarization assembly 104 can also include a field stop 220 between the first 212 and second 216 variable retarders. Each variable retarder 212, 216 generally includes a transmission medium or element 224 and a transmission element driver 228. In accordance with embodiments of the present invention, the transmission element 224 of the first variable retarder 212 has a modulator optical axis or variable transmission optical axis, also known as the birefringence axis, rotated such that it is held at a fixed, non-zero angle with respect to the modulator axis of the transmission element 224 of the second variable retarder 216. For instance, the angle between the modulator axes of the variable transmission elements 224 is 45°. In accordance with still other embodiments of the present invention, the transmission elements 224 are within planes that are parallel to one another. The material from which the variable transmission elements 224 are formed can be selected based on the operative wavelengths of the instrument 100. For example, the variable transmission elements 224 can comprise quartz, fused silica, or magnesium fluoride, where the instrument 100 is operable at ultraviolet and visible wavelengths.

The transmission element drivers 228 each operate to vary one or more optical retardance characteristics of an associated transmission element 224. For example, with respect to variable retarders 212, 216 comprising photo-elastic modulators (PEMs), the transmission element drivers 228 can comprise piezo-electric drivers that introduce an acoustic wave in the associated transmission element 224. Moreover, a standing acoustic wave can be produced at a resonant frequency of the transmission element 224. As can be appreciated by one of skill in the art, the creation of an acoustic wave in a transmission element 224 creates stress that changes the index of refraction along the modulator axis of the transmission element 224. More particularly, when the transmission element 224 is compressed, the polarization component parallel to the modulator axis travels slightly faster than the polarization component perpendicular to the modulator axis. In this state, the modulator axis (e.g., the horizontal component) then leads the perpendicular axis (e.g., the vertical component) after the received light 116 passes through the transmission medium 224. If the transmission element 224 is stretched, the polarization component parallel to the modulator axis travels slightly slower than the perpendicular component. In this second state, the polarization component parallel to the modulator axis lags the perpendicular component after the received light 116 passes through the transmission element 224. Accordingly, as the standing acoustic wave produced in the transmission element 224 transitions from compressing the transmission element 224, through leaving the transmission element 224 in an unstressed state, and to stretching the transmission element 224, the polarization effect on the received light 116 varies in time. Moreover, across at least a limited area of the transmission element 224, the maximum and minimum retardance amounts are essentially the same at any one instant in time. Accordingly, by confining the pupil or area of the beam comprising the received light 116 to this effective area of the transmission medium 224, the polarization effect imparted to the received light 116 is essentially the same across the effective area at any one moment. As used herein, essentially the same means that the maximum difference in the optical retardance of the transmission element 224 across the effective area is less than or equal to 10%, resulting in a difference in polarization effect across the effective area of less than 10%. As discussed in greater detail elsewhere herein, the amplitude of the maximum and minimum retardance of received light by each variable retarder 212, 216 is selected so that the diagonal terms of the Mueller matrix for the depolarization assembly 104 are zero.

As further examples, variable retarders 212, 216 can comprise liquid crystal variable retarders, with transmission element drivers 228 comprising liquid crystal control circuitry. In accordance with other embodiments, the variable retarders 212, 216 can comprise variable transmission elements 224 having a polarization effect that varies across the effective surface of the transmission element 224. In such embodiments, the transmission element drivers 228 may comprise motors or other actuators operable to move the variable transmission elements 224 relative to a suitable axis in a geometry relative to the beam of received light 116.

As can be appreciated by one of skill in the art after consideration of the present disclosure, the temporally depolarized light 120 that is passed to the sensor assembly 124 by the depolarization assembly 104 is typically not depolarized at any particular instant in time. Instead, averaged over some period of time corresponding to multiple cycles of the variable retarders 212, 216, the temporally depolarized light 120 output by the depolarization assembly 104 is depolarized. Accordingly, a depolarization assembly 104 in accordance with embodiments of the present invention is suitable for use in providing depolarized light to a sensor assembly 124 having an integration time of sufficient extent to include multiple cycles of the variable retarders 212, 216. For example, for variable retarders 212, 216 that cycle through their maximum and minimum retardance amounts at a rate of 50 kHz, a full polarization variation cycle could be completed in 20 microseconds. A sensor assembly 124 with an integration time of 2 milliseconds would therefore receive temporally depolarized light 120 summed over 100 polarization cycles during the sensor integration time, effectively destroying or scrambling the polarization of the light 120 across that integration time.

The depolarization assembly 104 can additionally include a controller 232. The controller 232 generally operates to provide power and/or control signals to the transmission element drivers 228. For example, where the transmission element drivers 228 comprise piezo-electric modulators, the controller 232 can provide input signals to the transmission element drivers 228 at desired frequencies and amplitudes. In accordance with still other embodiments, for example where the transmission element drivers 228 comprise LCD controllers for use in connection with variable transmission elements 224 comprising liquid crystal variable retarders, the controller 232 can provide signals to control the switching of individual pixels of the liquid crystal elements and the frequency of that switching. In accordance with still further embodiments, for example where the variable transmission mediums 224 comprise wave plates with retardance that varies over the operative area of the mediums, and the transmission element drivers 228 comprise motors or other actuators, the controller 232 can control the frequency at which the transmission element drivers 228 move the respective variable transmission mediums 224.

In accordance with embodiments of the present invention, a computer 236 may be included for providing an interface to and/or control over the system 100. For example, the computer 236 can provide a graphical user interface or otherwise accept input from a user to control the operation of the depolarization assembly 104 and/or other components of the system 100. As yet another example, the computer 236 can execute program instructions to control operation of the depolarization assembly 104 and/or other components of the system 100.

In FIG. 2, a sensor assembly 124 comprising a notional spectrometer is depicted. However, any sensor assembly 124 that can usefully operate in response to a signal comprising temporally depolarized light 120 can be included in the system 100. In this example, a temporally depolarized light 120 is provided to sensor assembly receive optics 240. The receive optics 240 pass the temporally depolarized light 120 to a diffraction grating 244. The diffraction grating 244 in turn passes spectrally dispersed light 248 to focusing optics 252, which image the spectrally dispersed light onto a detector 256. In accordance with embodiments of the present invention, the detector 256 can comprise a two-dimensional array of elements or pixels. In accordance with still other embodiments, the detector 256 can comprise a one-dimensional array of elements, or a single element detector. The operation, collection of information, and/or other aspects of the detector 256 or other elements of the sensor assembly 124 may be controlled by or in association with the computer 236, or other control elements.

Figure 3:
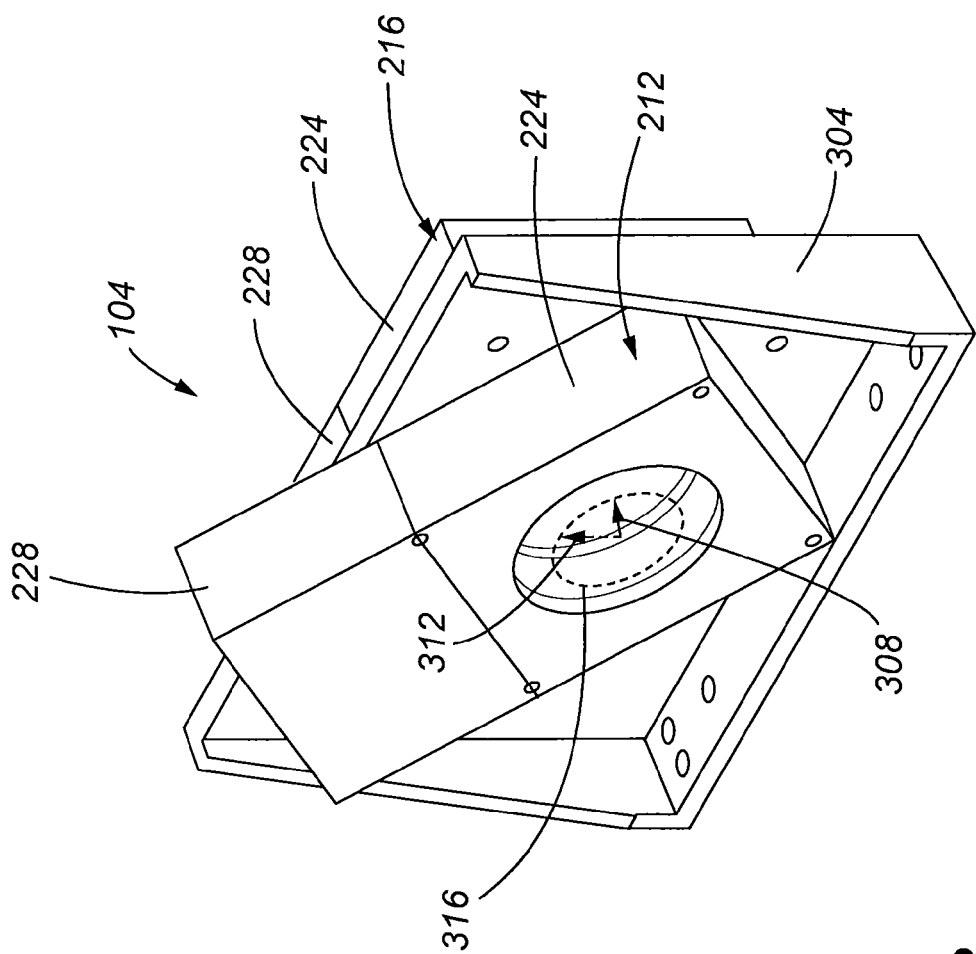
FIG. 3 depicts a depolarization assembly in accordance with embodiments of the present invention.

FIG. 3 depicts a depolarization assembly 104 in accordance with an exemplary embodiment of the present invention. As depicted in this example, the first variable retarder 212 and the second variable retarder 216 are mounted to a frame or support structure 304. The field stop 220 (see FIG. 2) can be formed by the frame 304. Moreover, the first variable retarder 212 is held by the frame 304 such that the modulator axis 308 of the transmission element 224 of the first variable retarder 212 is at an angle of 45° with respect to the variable transmission axis 312 of the transmission element 224 of the second variable retarder 216 (depicted by dotted line 312). Also depicted by the dotted circular line 316 is the effective area of the transmission element 224 included in the first variable retarder 212. Although not visible in the figure, the effective area 316 of the transmission element 224 of the first variable retarder 212 is generally aligned with the effective area of the variable transmission medium included in the second variable retarder 216. In addition, the transmission element drivers 228 are shown in their operative position, abutting their associated variable transmission mediums 224.

Figure 4:
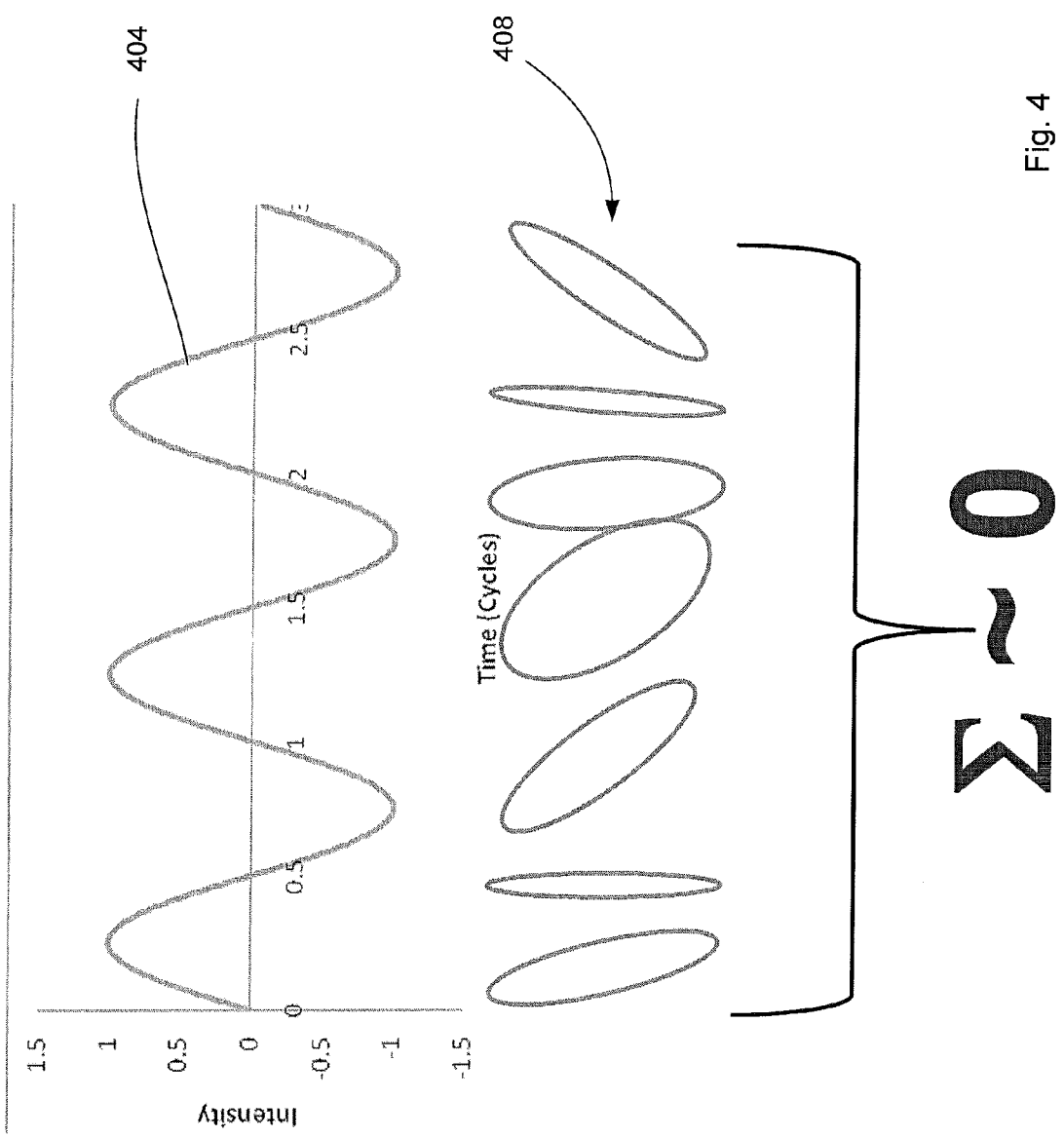
FIG. 4 illustrates the polarization effect over time of a depolarization assembly in accordance with embodiments of the present invention over time.

FIG. 4 illustrates the polarization effect over time of a depolarizing assembly 104 in accordance with embodiments of the present invention. In the upper portion of the figure, the intensity of the standing wave 404 produced in the transmission element 224 by an associated transmission element driver 228 is depicted over three cycles. Below the depiction of the standing wave 404 is a depiction of the resulting polarization states 408 of the temporally depolarized light 120 passed through the variable retarders 212, 216 of the depolarization assembly 104 at different moments in time. Summed over a number of acoustic wave 404 periods, the net polarization effect is zero. That is, over a sufficient period of time, the net polarization effect is zero. Accordingly, the depolarization assembly 104 depolarizes in the time domain.

The following discussion summarizes the theory of operation for a time domain polarization scrambler or depolarization assembly 104 in accordance with embodiments of the present invention. An ideal scrambler is represented by the ideal depolarizer Mueller matrix $T_{scr}$, which removes all polarization from the incoming beam while conserving the total intensity of the light passing through it, $$T_{scr}S_{in} = \begin{pmatrix} 1 & 0 & 0 & 0 \\ 0 & 0 & 0 & 0 \\ 0 & 0 & 0 & 0 \\ 0 & 0 & 0 & 0 \end{pmatrix}\begin{pmatrix} S_0 \\ S_1 \\ S_2 \\ S_3 \end{pmatrix} = T_{scr}\left[\begin{pmatrix} S_0 - S_{pol} \\ 0 \\ 0 \\ 0 \end{pmatrix} + \begin{pmatrix} S_{pol} \\ S_1 \\ S_2 \\ S_3 \end{pmatrix}\right] = \begin{pmatrix} S_0 \\ 0 \\ 0 \\ 0 \end{pmatrix},$$

where $S_{pol}=\sqrt{S_1^2+S_2^2+S_3^2}$ is the polarized intensity. The degree to which $T_{scr}$ has non-zero elements determines the degree to which the optical system transforms polarization variations into unwanted intensity variations. In the present example, the depolarization assembly 104 is implemented as a pair of Photo-Elastic Modulators (PEMs), set at an angle to each other, operating as variable retarders 212, 216. This analysis considers only a single wavelength. Optimal performance parameters can be derived by, for instance, minimizing the system Mueller matrix elements against the two retardances and the relative angle. Initial measurements of this exemplary implementation suggest that this optical component is remarkably tolerant to wide spectral ranges.

The photo-elastic modulators include glass blocks or transmission elements 224 excited by a standing acoustic wave to produce a spatially static, temporally variable wave plate. As an example, the variable retarders 212, 216 can comprise two photo-elastic modulator systems, (PEMs) available from Hinds Instruments, Inc. (model II/42-47 dual modulator system), together with associated electronic drivers and mounting hardware. Each light ray through a point on the surface of a block 224 of a PEM experiences a temporal variation of phase difference, with the amplitude of the difference being a function only of position on the surface of the block 224. The retardance Δ of a PEM can be written as $\Delta(t)=A \sin(\omega t)$, where ω is the ~50 kHz acoustic frequency of operation; this ultrasonic frequency allows many depolarizer cycles during a typical integration time.

The following optical setup, from optical entrance to exit, describes an exemplary PEM depolarizer in accordance with embodiments of the present invention:

Variable retarder #1 212 at angle $\theta_1=\theta_{ref}$ with retardance $\Delta_1$ at frequency $\omega_1$ Variable retarder #2 216 at angle $\theta_2=\theta_{ref}+\theta$ with retardance $\Delta_2$ at frequency $\omega_2$ Angle $\theta_i$ is the angle of the retarder 212, 216 fast axis relative to a reference direction $\theta_{ref}$. The reference direction is chosen to be horizontal, $\theta_{ref}=0$, thereby defining the direction of Stokes parameter $S_1$. Angles of the optical axes are θ>0 for a counterclockwise rotation looking into the beam. Without loss of generality we set $\omega_2=q\omega_1$. The Mueller matrix T of the ideal optical system defined above is written as $$T=R(\theta_2)Q(\Delta_2)R(-\theta_2)R(\theta_1)Q(\Delta_1)R(-\theta_1)$$

where $Q(\Delta)$ is the Mueller matrix of a wave plate with retardance Δ and $R(\theta)$ is the rotation matrix for angle θ. Analysis of the $T_{11}$ term requires θ to be π/4. Using the first order Bessel function series approximation for terms like $\cos\lfloor A_{1,2} \sin(\omega t)\rfloor$, and averaging over m>>1 cycles of PEM oscillation (at frequency $\omega_1$), the scrambler Mueller matrix becomes $$(T_0) = \begin{pmatrix} 1 & 0 & 0 & 0 \\ 0 & J_0(A_2) & \frac{2J_1(A_1)J_1(A_2)[-q\cos(2m\pi q)\sin(2m\pi)+\cos(2m\pi)\sin(2m\pi q)]}{m\pi(q^2-1)} & \frac{-2J_0(A_1)J_1(A_2)\sin^2(m\pi q)}{m\pi q} \\ 0 & 0 & J_0(A_1) & \frac{2J_1(A_1)\sin^2(m\pi)}{m\pi} \\ 0 & \frac{2J_1(A_2)\sin^2(m\pi q)}{m\pi q} & \frac{-2J_1(A_1)J_0(A_2)\sin^2(m\pi)}{m\pi} & J_0(A_1)J_0(A_2) \end{pmatrix}$$

The scrambler Mueller matrix contains two different types of terms. The off-diagonal elements all derive from long-time averaging over m modulator (transmission element 224) cycles. These terms contain m in the denominator, and will vanish as m becomes large. The remaining terms on the diagonal can be made to vanish by choosing $A_1$ and $A_2$ such that the function values $J_0(A_1)=J_0(A_2)=0$, e.g. by choosing the first zero of $J_0$ for both retardance amplitudes, $A_1=A_2=2.40493$ radians. As can be appreciated by one of skill in the art, the nature of the $J_0$ function permits equivalent operation at any of a multitude of $A_1$ and $A_2$ amplitudes. The use of $A_1=A_2=2.40493$ radians in discussion of the exemplary embodiment shall include by inference scrambler embodiments using any other amplitudes fulfilling TDPS requirements derived in the manner shown above. In particular, any amplitude of retardance $A_1$ and $A_2$ for which $J_0(A_1)=J_0(A_2)=0$ can be used as the retardance of the variable retarders 212, 216 of a depolarization assembly 104 in accordance with embodiments of the present invention. Furthermore, q should not be unity. The resulting Mueller matrix is the total depolarizer matrix with $T_{00}=1$, and all other elements vanishing. The effects of off-axis propagation and finite spectral bandwidth are major areas of detailed investigation, both analytically and by measurement.

The above symbolic expression for $T=T(\Delta_1, \Delta_2, \theta)=T(A_1, A_2, \theta)$ represents the exact Mueller matrix of the time-domain polarization scrambler, using ideal retarders. The value of $T(A_1, A_2, \theta)$ was computed for $0 \leq A_1, A_2 \leq 2\pi$ to verify the conclusions drawn from the first and third order Bessel function expansions. Each matrix element was averaged over 1000 cycles of $\omega_1$; equivalent results were obtained for 100 cycle averages. The effect of different frequency ratios q was investigated, but has no direct bearing on the major results (except that $q \neq 1$). The numerical simulation and the analytic development (summarized here) both verify that the TDPS operates as presented above.

It should be noted that this dual PEM optical configuration can, with the addition of an insertable linear polarizer after the second variable retarder 216, be used as a polarimeter. The spectral bandwidth is limited by the spectral falloff of any set retardance amplitude. Nevertheless, if state switch time is accounted for, an imaging spectropolarimeter results.

No matter the implementation of the depolarizer assembly 104, the proof of its effectiveness always reduces to measurement of some part of its Mueller matrix. Ideally, a measurement of the optical element's full Mueller matrix is needed (at each wavelength of interest) to characterize its polarization properties.

Figure 5:
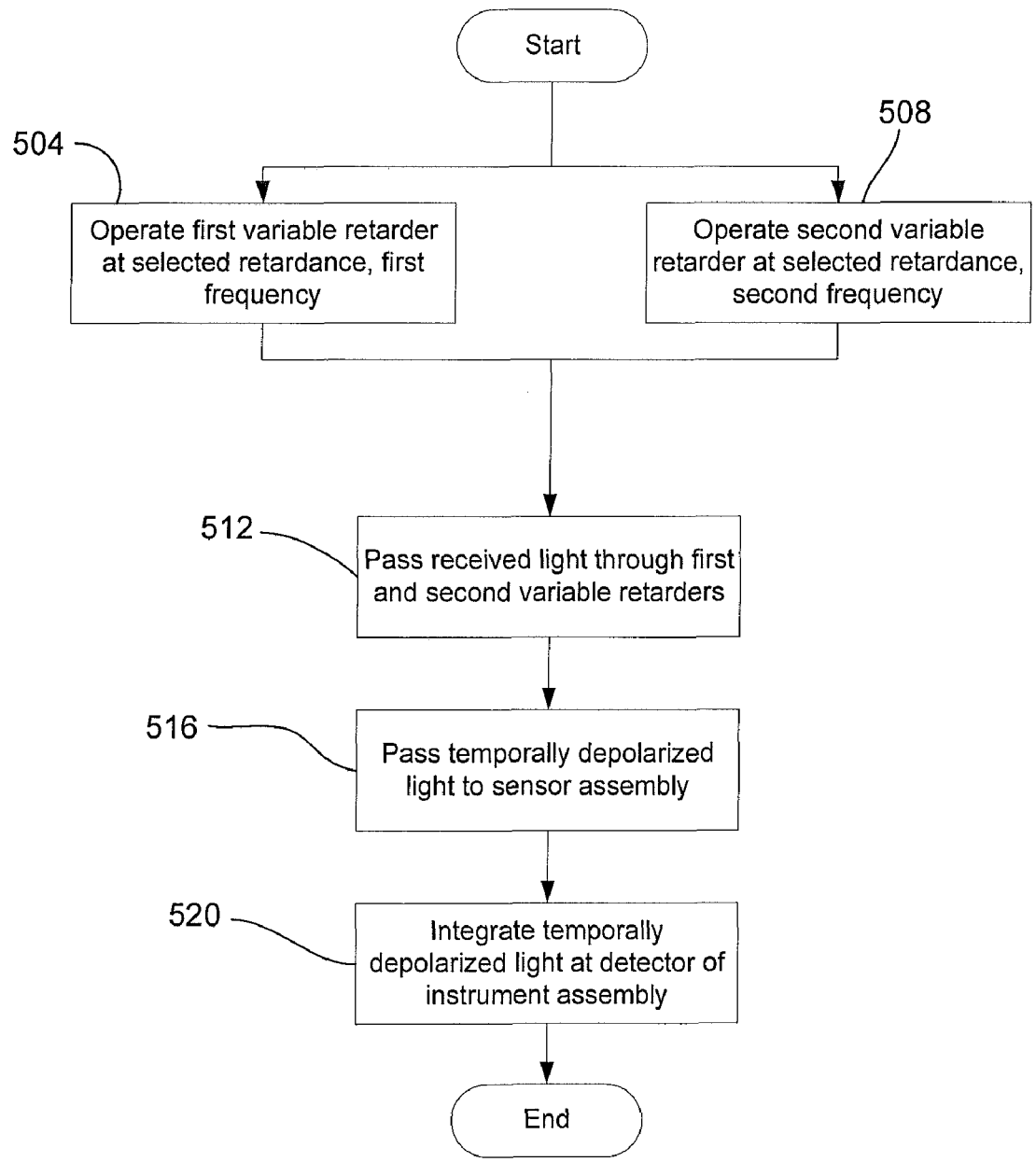
FIG. 5 is a flowchart depicting aspects of the operation of a depolarization assembly in accordance with embodiments of the present invention.

Aspects of the operation of a depolarization assembly 104 and a method for temporally depolarizing light in accordance with embodiments of the present invention are illustrated in FIG. 5. In general, a first variable retarder 212 is operated at a selected maximum and minimum retardance and at a selected frequency of variance in retardance or retardance cycles (step 504). In addition, a second variable retarder 216 is operated at the same or a different selected maximum and minimum retardance and frequency (step 508). As can be appreciated by one of skill in the art, where the variable retarders 212, 216 comprise photo-elastic modulators, the variation in retardance is a function of the transmission element 224 composition and dimensions, and the amplitude of the excitation imparted to the medium 224 by the transmission element driver 228. Moreover, the frequency at which the retardance cycles between maximum and minimum amounts can be determined by the frequency of the excitation imparted by the transmission element driver 228. For a variable retarder 212, 216 comprising a liquid crystal variable retarder transmission element 224, the amplitude of the retardance is determined by the characteristics of the liquid crystal material, and the frequency of operation can be determined by the frequency at which the transmission element driver 228 switches the pixels of the liquid crystal retarder. For a variable retarder 212, 216 comprising a wave plate with retardance that varies across the area of the medium, the amplitude of the retardance is determined by the dimensions and/or composition of the medium 224, while the frequency is determined by the frequency at which the transmission element driver 228 moves the element.

At step 512, received light 116 is passed through the first and second variable retarders 212, 216 in series. The resulting temporally depolarized light 120 is then passed to the sensor assembly 124 (step 516). In particular, as discussed in greater detail elsewhere herein, the light 120 output by a depolarization assembly 104 in accordance with embodiments of the present invention is, on average, depolarized over multiple cycles of the variable retarders 212, 216. At step 520, the depolarized light is integrated at a detector. In particular, the frequency of the variable retarders 212, 216 and the integration time of the sensor assembly 124 detector 256 are chosen such that multiple cycles of the variable retarders 212, 216 are completed during the detector 256 integration time. Because, over the integration time, the light 120 output by the depolarization assembly 124 is depolarized, the information regarding the intensity of light received at the detector 256 is free from polarization effects.

In accordance with exemplary embodiments of the present invention, the retardance of each of the variable retarders 212, 216 is about ±2.4 radians. In accordance with further exemplary embodiments, the retardance of each of the variable networks 212, 216 varies by ±2.405 radians per cycle. The frequency at which the variable retarders 212, 216 cycle is ~50 kHz or greater. The integration time of the sensor instrument 124 detector 256 is 2 milliseconds or greater. In accordance with still other embodiments, the frequency of variation of the variable retarders 212, 216 and the integration time of the detector 256 are such that at least about 100 cycles of the variable retarders 212, 216 are completed per observation by the sensor assembly 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A depolarization system, comprising:
   a first variable transmission element located along a first optical path;
   a first transmission element driver, wherein the first transmission element driver is operated to vary an index of refraction of the first variable transmission element in a first axis of transmission at a first frequency, wherein the first axis of transmission is a birefringence axis of the first variable transmission element;
   a second variable transmission element located along the first optical path;
   a second transmission element driver, wherein the second transmission element driver is operated to vary an index of refraction of the second variable transmission element in at least one of the first axis of transmission or a second axis of transmission at a second frequency, wherein the at least one of the first and second axes of transmission is a birefringence axis of the second variable transmission element, and wherein the first frequency is different than the second frequency.

2. A depolarization system, comprising:
   a first variable transmission element located along a first optical path;
   a first transmission element driver, wherein the first transmission element driver is operated to vary an index of refraction of the first variable transmission element in a first axis of transmission at a first frequency;
   a second variable transmission element located along the first optical path;
   a second transmission element driver, wherein the second transmission element driver is operated to vary an index of refraction of the second variable transmission element in at least one of the first axis of transmission or a second axis of transmission at a second frequency, wherein the first transmission element driver varies the index of refraction of the first variable transmission element in the first axis of transmission so as to produce an optical retardation from minus a first amount, ±0.05 radians, to plus the first amount, ±0.05 radians, and wherein the second transmission element driver varies the index of refraction of the second variable transmission element in the at least one of the first axis of transmission or the second axis of transmission so as to produce an optical retardation from minus the first amount, ±0.05 radians, to plus the first amount, ±0.05 radians.

3. The system of claim 2, wherein the first amount is 2.4 radians.

4. The system of claim 2, wherein the first axis of transmission of the first variable transmission element is a modulator optical axis, wherein the second transmission element driver is operated to vary an index of refraction of the second variable transmission element in the first axis of transmission of the second variable transmission element, wherein the first axis of transmission of the second variable transmission element is a modulator optical axis, and wherein the modulator optical axis of the second transmission element is at an angle of 45 degrees with respect to the modulator optical axis of the first transmission element.

5. The system of claim 4, wherein the first transmission element driver excites the first variable transmission element, and wherein the second transmission element driver excites the second variable transmission element.

6. The system of claim 5, wherein the first transmission element driver excites the first variable transmission element at the first frequency, and wherein the second transmission element driver excites the second variable transmission element at the second frequency.

7. A depolarization system, comprising:
a first variable transmission element located along a first optical path;
a first transmission element driver, wherein the first transmission element driver is operated to vary an index of refraction of the first variable transmission element in a first axis of transmission at a first frequency;
a second variable transmission element located along the first optical path;
a second transmission element driver, wherein the second transmission element driver is operated to vary an index of refraction of the second variable transmission element in at least one of the first axis of transmission or a second axis of transmission at a second frequency, wherein the first frequency is different than the second frequency, wherein the first variable transmission element and the first transmission element driver together comprise a first photo-elastic modulator, and wherein the second variable transmission element and second transmission element driver together comprise a second photo-elastic modulator.

8. The system of claim 7, wherein the transmission medium of the first and second transmission elements is fused silica.

9. A depolarization system, comprising:
a first variable transmission element located along a first optical path;
a first transmission element driver, wherein the first transmission element driver is operated to vary an index of refraction of the first variable transmission element in a first axis of transmission at a first frequency;
a second variable transmission element located along the first optical path;
a second transmission element driver, wherein the second transmission element driver is operated to vary an index of refraction of the second variable transmission element in at least one of the first axis of transmission or a second axis of transmission at a second frequency, wherein the first frequency is at least about 50 kHz, wherein the second frequency is equal to the first frequency multiplied by a constant, and wherein the constant is not equal to one.

10. A method for depolarizing light, comprising:
collecting light;
operating a first variable retarder at a first frequency, wherein a retardance of the first variable retarder varies in a first axis of transmission at the first frequency, wherein the first variable retarder includes a first transmission element, and wherein the first frequency is equal to an excitation frequency of the first transmission element;
operating a second variable retarder at a second frequency, wherein a retardance of the second variable retarder varies in one of the first axis of transmission and a second axis of transmission at the second frequency, wherein the second variable retarder includes a second transmission element, wherein the second frequency is equal to an excitation frequency of the second transmission element, and wherein the first frequency is not equal to the second frequency;
while operating the first variable retarder at the first frequency, passing collected light through the first variable retarder;
while operating the second variable retarder at the second frequency, passing light passed through the first variable retarder through the second variable retarder, wherein light passed through the second variable retarder is temporally depolarized light.

11. The method of claim 10, wherein the retardance of the first and second variable retarders varies from a minimum of −2.4 radians, ±0.05 radians, to a maximum of ±2.4 radians, 10.05 radians.

12. The method of claim 10, wherein the first and second frequencies are of the order of magnitude of 50 kHz.

13. The method of claim 12, wherein the first frequency is approximately the same as the second frequency.

14. The method of claim 10, further comprising:
passing the temporally depolarized light to a sensor assembly.

15. A method for depolarizing light, comprising:
collecting light;
operating a first variable retarder at a first frequency, wherein a retardance of the first variable retarder varies at the first frequency;
operating a second variable retarder at a second frequency, wherein a retardance of the second variable retarder varies at the second frequency;
while operating the first variable retarder at the first frequency, passing collected light through the first variable retarder;
while operating the second variable retarder at the second frequency, passing light passed through the first variable retarder through the second variable retarder, wherein light passed through the second variable retarder is temporally depolarized light;
passing the temporally depolarized light to a sensor assembly;
integrating the temporally depolarized light by a detector for an interval equal to at least 2 milliseconds.

16. A depolarization assembly, comprising:
a first variable retarder, including:
a transmission element, wherein the transmission element intersects a first optical path, and wherein the transmission element has a modulation axis;

a transmission element driver, wherein the transmission element driver operates to vary a retardance of the transmission element about the modulation axis at a first predetermined frequency;

a second variable retarder, including:
   a transmission element, wherein the transmission element intersects the first optical path, wherein the transmission element has a modulation axis, and wherein the modulation axis of the transmission element of the first variable retarder is rotated with respect to the modulation axis of the transmission element of the second variable retarder;
   a transmission element driver, wherein the transmission element driver operates to vary a retardance of the transmission element about the modulation axis at a second predetermined frequency.

17. A depolarization assembly, comprising:
a first variable retarder, including:
   a transmission element, wherein the transmission element intersects a first optical path, and wherein the transmission element has a modulation axis;
   a transmission element driver, wherein the transmission element driver operates to vary a retardance of the transmission element about the modulation axis at a first frequency;
a second variable retarder, including:
   a transmission element, wherein the transmission element intersects the first optical path, wherein the transmission element has a modulation axis, and wherein the modulation axis of the transmission element of the first variable retarder is rotated with respect to the modulation axis of the transmission element of the second variable retarder;
   a transmission element driver, wherein the transmission element driver operates to vary a retardance of the transmission element about the modulation axis at a second frequency, wherein the first and second variable retarders are photo-elastic modulators, wherein the transmission elements are formed from fused silica, and wherein the transmission element drivers are piezo electric drivers that operate to introduce an acoustic wave in the transmission elements.

18. The depolarization assembly of claim 17, wherein the first frequency is equal to a resonant frequency of the transmission element of the first variable retarder.

19. The depolarization assembly of claim 17, further comprising:
   a frame, wherein the first variable retarder is mounted to the frame such that the modulation axis of the transmission element of the first variable retarder is held at a first angle, wherein the second variable retarder is mounted to the frame such that the modulation axis of the transmission element of the second variable retarder is held at a second angle, and wherein the first angle is rotated by about 45 degrees with respect to the second angle.

* * * * *